Oct. 26, 1948.　　　　　H. STUKART　　　　　2,452,403
SWITCH CONTROL MECHANISM FOR
MEAT TENDERING APPARATUS

Filed Oct. 27, 1943　　　　　　　　　　　　　2 Sheets-Sheet 1

Inventor:
Hendrik Stukart,
By Spencer, Marzall, Johnston & Cook,
Attys.

Oct. 26, 1948.  H. STUKART  2,452,403
SWITCH CONTROL MECHANISM FOR
MEAT TENDERING APPARATUS
Filed Oct. 27, 1943  2 Sheets-Sheet 2
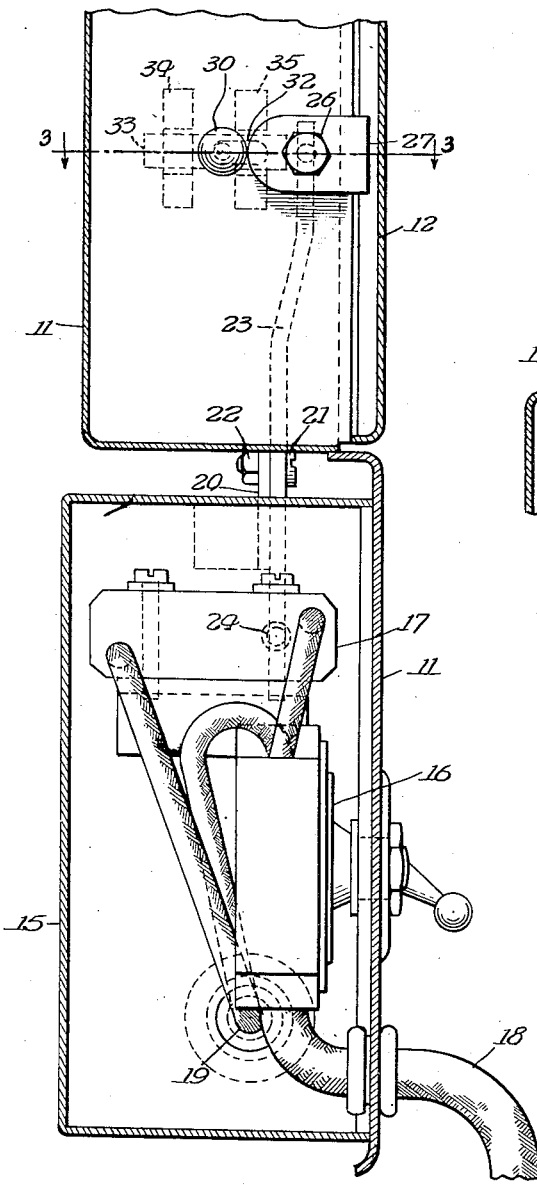
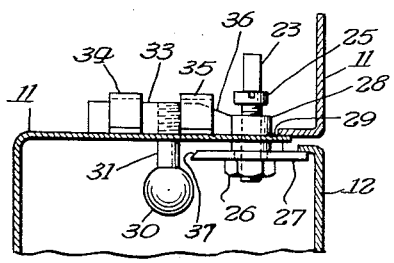
Inventor:
Hendrik Stukart,
By Spencer, Margall, Johnston & Cook,
Attys.

Patented Oct. 26, 1948

2,452,403

UNITED STATES PATENT OFFICE 2,452,403

SWITCH CONTROL MECHANISM FOR MEAT TENDERING APPARATUS

Hendrik Stukart, La Porte, Ind., assignor to U. S. Slicing Machine Company, La Porte, Ind., a corporation of Indiana Application October 27, 1943, Serial No. 507,800

10 Claims. (Cl. 200—50)

1

This invention relates to switch mechanism to be used in food tendering machines.

A principal object of the invention is to provide a new and improved safety switch mechanism whereby the operating mechanism of the food tendering machine is shut off whenever the cover of the machine is opened.

Another object of the invention is to provide a new and improved safety switch mechanism of the type described wherein, at the wish of the operator, the operating mechanism may be temporarily re-started whereby the operator may observe the operation of the machine, may make adjustments under actual operating conditions, or may clean some of the operating parts.

Numerous other objects and advantages will be apparent throughout the progress of the following specification.

The accompanying drawings illustrate one embodiment of a device incorporating the features of the present invention, in which Fig. 1 is a right elevational view with some of the parts broken away for the sake of clearness;

Fig. 2 is a detail sectional view on the line 2—2 of Fig. 1; and

Fig. 3 is a detail sectional view on the line 3—3 of Fig. 2.

Figure 1:
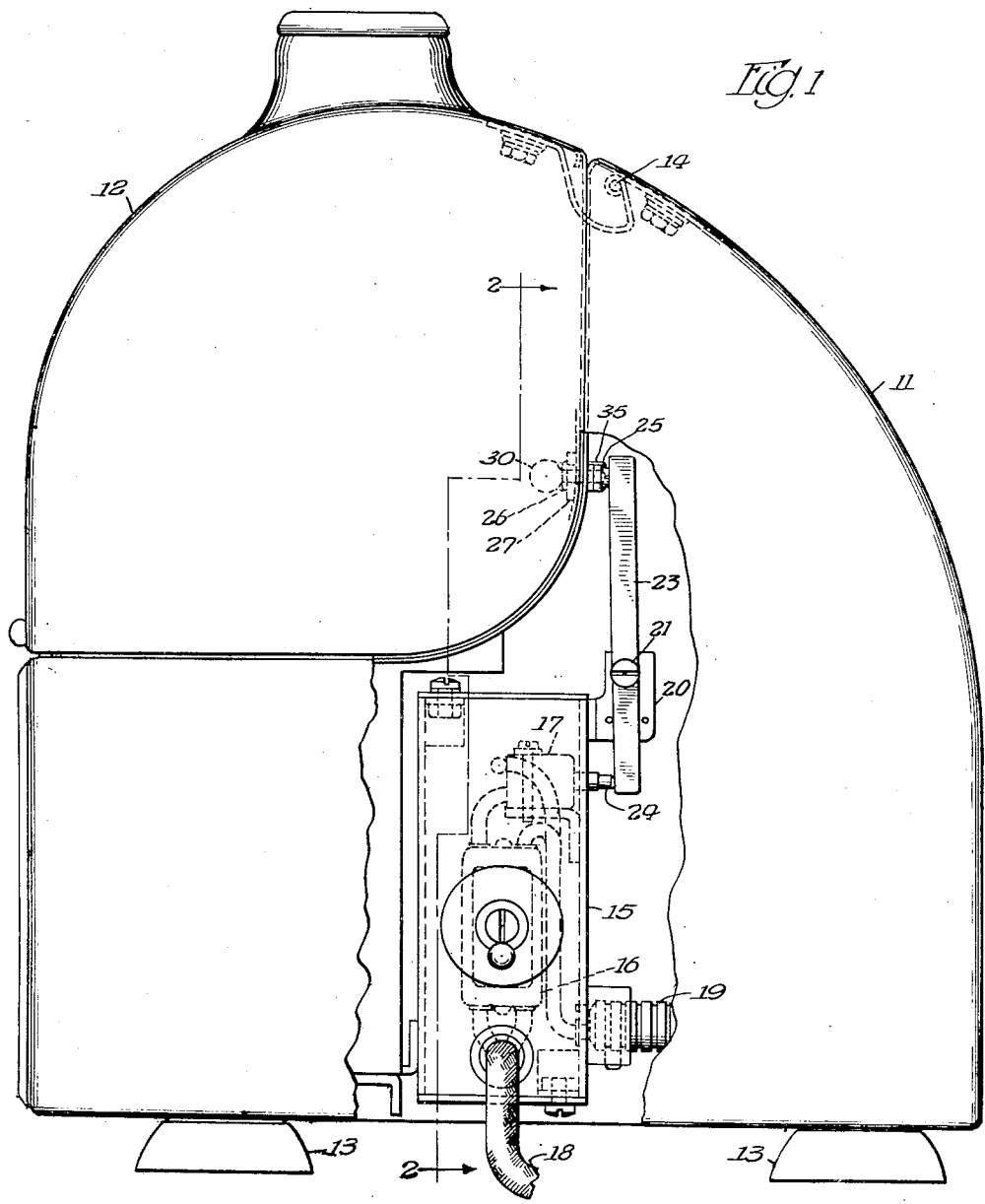

The particular device herein disclosed for the purpose of illustrating the invention is associated with meat tendering machines of the type disclosed in a co-pending application filed by Arthur H. Ahrndt, Serial No. 455,561, filed August 21, 1942, now Patent No. 2,409,463. issued October 15, 1946, and assigned to the present assignee.

In machines of this type the entire operating mechanism is ordinarily supported by and mounted within a housing embodying a base 11 and a cover 12, and the entire assembly is suitably supported, by such as a plurality of rubber mounting feet 13. To provide access to the operating parts of the machine, the cover 12 is hinged as at 14.

In my embodiment a switch housing 15 is secured to one wall of the base 11 and provides a housing for an off-on toggle switch 16 and a safety switch 17. The toggle switch 16 is inserted between the power supply line 18 and the line 19 to the drive motor of the meat tendering machine, whereas the safety switch 17 is placed in series with one of the wires from the switch 16 to the line 19. The switch 16 is the main off-on switch of the machine, and the switch 17 is used as a safety switch. Opening either switch shuts off the current supply to the motor and stops the meat tendering machine.

A bracket 20, secured to the rear of the switch housing 15, provides a fulcrum, by way of a bolt 21 and a nut 22, for a lever 23. The lower end of the lever 23 is adapted to contact an operating finger 24 on the safety switch 17. When the operating finger 24 is depressed in toward the switch 17 the contact is made or closed. When the operating finger 24 is released a spring contained within the safety switch 17, forces the operating finger 24 away and breaks the switch connection. Viewing Fig. 1, the operating finger 24 is urged in when the lever 23 is rotated clockwise and is released when the lever 23 is permitted to move counter-clockwise.

The lever 23 may be moved in its clockwise direction through the action of an adjustable tappet 25 which is screwed into a nut 26. The nut 26 is preferably welded to a bracket 27 which is secured to the cover 12. Thus, as the cover 12 is raised or lowered it will carry with it the tappet assembly. A ferrule 28 is placed around the shank of the tappet 25 in order to guide the entire tappet assembly into a hole 29 in the base 11 to hold the cover 12 rigid when it is closed.

The tappet 25 is so adjusted that when the cover is closed it will urge the lever 23 in a clockwise direction sufficiently far to operate the finger 24 to close the safety switch 17. When the cover 12 is opened it will carry with it the tappet 25, breaking contact between it and the lever 23 and will permit the internal spring within the safety switch 17 to move the finger 24 outwardly and shift the lever 23 counter-clockwise, and the switch will open.

The lever 23 may also be shifted in its clockwise direction to close the switch 17 by moving a hand control knob 30 to the right (Figs. 2 and 3). The hand control knob 30 is provided with a threaded reduced portion 31 which extends through a slot 32 in the base 11 and is threaded within a slidable actuating block 33. The actuating block 33 is slidably mounted with brackets 34 and 35 to the base 11 and is provided with a ramp portion 36. Looking at Fig. 3, when the cover 12 is open the entire tappet assembly terminating with the tappet 25 will be out of the way of the lever 23, and the lever 23 will be permitted to move forwardly thereby opening the safety switch 17. If under these conditons the hand knob 30 is moved toward the right, the ramp 36 of the block 33 will urge the lever arm 23 rearwardly, thus closing the safety switch 17 and re-starting the operating mechanism of the food tendering machine. However, in so doing the block 33 will cover a part of the opening 29 in the housing 11 and, therefore, the cover 12 may not be closed. If an attempt is made to close the cover, the tappet 25 will abut against the forward face of the block 33 to prevent its closing until the hand control 30 is moved to the left and the block 33 is again in an inoperative position, as shown in Figs. 2 and 3. Thus, the operator is assured that a subsequent opening of the cover will again stop the operating mechanism.

Means for automatically returning the hand control knob 30 to its left hand position, by closing the closure, may be provided through the use of an extended portion 37 of the bracket 27 (Fig. 3). The extended portion 37 preferably should be made with an inclined face and the position 37 should be long enough so that such face will contact the hand control knob 30, when the latter has been removed from its left hand position. A continued lowering of the cover will cause the face 37 to urge the hand control knob 30 from its operative to its inoperative position with respect to the lever 23, to assure a stoppage of the machine by the automatic closing of the switch 24, upon any subsequent opening of the cover.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. In a meat tendering machine having a source of power, a base, a cover and a safety switch, means for operating said safety switch to disconnect the source of power when the cover is opened, said means including a manually operable member adapted to render said switch operating means functionally ineffective, and means controlled by the closing of the cover to return said operable member to original position.

2. In a device having a source of power, a shiftable cover and a safety switch, means for operating said safety switch, an actuating member operable only when the cover is closed, a manual operating means operable when the cover is open, and means controlled by the shifting of the cover to closed position to return the safety switch to original position.

3. In a meat tendering machine a base, a cover, a safety switch, and means for operating said safety switch, embodying a pivotally mounted lever, a lever actuating member carried by the cover and adapted to actuate said lever automatically as the cover is closed, a manually operable lever actuating means operable only when the cover is open, and means whereby said safety switch will be shifted to original position automatically when the cover is closed.

4. In a meat tendering machine a switch, a base, a cover, a lever fulcrumed on said base and adapted to close said switch, means operable by said cover and adapted to operate said lever automatically to thereby close said switch when the cover is closed, manually operable shiftable means operable only when the cover is opened to operate said lever to thereby permit manual closure of said switch, and means for shifting said manually operable shiftable means automatically to an inoperative position whenever said cover is closed to thereby insure automatic opening of said switch upon a subsequent opening of the cover.

5. In a meat tendering machine, a switch, a support, a cover mounted on the support, a lever adapted to close said switch, means operable by said cover and adapted to operate said lever automatically to thereby close said switch when the cover is closed, manually operable shiftable means operable only when the cover is opened to operate said lever to thereby permit manual closure of said switch, and means for shifting said manually operable shiftable means automatically to an inoperative position whenever said cover is closed to thereby insure automatic opening of said switch upon a subsequent opening of the cover.

6. A device embodying a switch and a cover, means adapted to close said switch, means operable by said cover and adapted to operate the first said means automatically to close said switch when the cover is closed, manually shiftable means operable only when the cover is opened to operate said first named means to thereby permit manual closure of said switch, and means whereby said manually operable shiftable means will be shifted automatically to an inoperative position, when said cover is closed, to thereby insure automatic opening of said switch upon a subsequent opening of the cover.

7. In a meat tendering machine having a source of power, a base, a cover, a safety switch, means tending normally to render said switch inactive when the cover is open, a pivotally mounted lever, a lever actuating means carried by the cover to render the switch active as the cover is closed, manual means carried by the base and adapted to be set at will to actuate the lever to render the switch active when the cover is open, and means for automatically rendering the said manual means inactive as the cover is closed.

8. In a meat tendering machine having a source of power, a base, a cover, a safety switch, means tending normally to render said switch inactive when the cover is open, a pivotally mounted lever, a lever actuating means carried by the cover to render the switch active as the cover is closed, manual means carried by the base and adapted to be set at will to actuate the lever to render the switch active when the cover is open, means for automatically rendering the said manual means inactive as the cover is closed, and means whereby the said manual means will operate to maintain the cover against closing.

9. In combination, a casing provided with a door, a switch housed within the casing, an actuator for the switch, two separate means for operating the said actuator, one of said means operating said actuator as the door is closed, the other of said means adapted to operate said actuator when the door is open, and means for automatically operating one of the said means to render it inactive, and the other of said means active, as the door is being closed.

10. In combination, a casing provided with a door, a switch housed within the casing, an actuator for the switch, two separate means for operating the said actuator, one of said means operating said actuator as the door is closed, the other of said means adapted to be manually set to operate said actuator when the door is open, and means for automatically operating the said manually set means to render it inactive, and the other of said means active, as the door is being closed.

HENDRIK STUKART.

REFERENCES CITED

The following references are of record in the file of this patent:

UNITED STATES PATENTS

| Number | Name | Date |
| --- | --- | --- |
| 1,357,726 | Richter | Nov. 2, 1920 |
| 1,424,407 | Helske | Aug. 1, 1922 |
| 2,087,589 | Bonnell et al. | July 20, 1937 |
| 2,230,869 | Neumann | Feb. 4, 1941 |